United States Patent Office

3,062,746
Patented Nov. 6, 1962

3,062,746
METHOD OF PREPARING FERRIMAGNETIC MATERIALS
Robert B. MacCallum, Baltimore, and Forrest R. Hurley, Ellicott City, Md., assignors to W. R. Grace & Co., New York, N.Y., a corporation of Connecticut
No Drawing. Filed Feb. 29, 1960, Ser. No. 11,431
5 Claims. (Cl. 252—62.5)

The present invention relates to a method of preparing mixed ferrite compositions having improved magnetic properties. In one specific embodiment it relates to a method of preparing crystalline ferrites consisting essentially of rare earth ferrites and especially yttrium ferrites having a garnet-like crystalline structure.

The ferrite materials are well known. The only naturally occurring ferrite which is found in the form of fairly large crystals is the well known ferrous ferrite ($FeO.Fe_2O_3$) or magnetite. This compound was characterized and studied in detail several years ago. Several synthetic ferrites have been prepared by the substitution of another oxide of a bivalent metal for the ferrous oxide in the magnetite structure. Thus, the compounds $NiO.Fe_2O_3$, $ZnO.Fe_2O_3$, $MnO.Fe_2O_3$ are well known and methods for preparing these compounds are discussed in the literature.

These ferrite materials have been the subject of considerable investigation in recent years due to their crystalline and magnetic properties. They are widely used in the preparation of special types of magnetic devices, especially magnets of special shapes. Several of the ferrites have applications in the electronic industry.

The rare earth type ferrites, and yttrium ferrites having the garnet-like structure, are relatively new. The chemical structure for these compounds is best represented by the empirical formula $5Fe_2O_3.3M_2O_3$ where M is yttrium or a rare earth ion of ionic radius less than 1.14 Angstrom units. The rare earths from samarium to lutetium form oxides with ionic radii falling in this range. This particular class of compounds is especially useful because of the microwave properties of several of its members, especially yttrium ferrite.

In the processes of the prior art the ferrites were prepared by purifying the iron and metal oxide and then reducing these oxides to very small size. The conventional method of carrying out this reduction in size of the oxide particles is grinding the purified oxides as a liquid slurry in a ball-mill. The products recovered from this size reduction and intermixture are then dried and heated to a sintering temperature which imparts a crystalline structure to the materials and allows the recovery of the ferrites having magnetic properties.

We have found that a mixture of ferric and rare earth oxides, particularly yttrium oxides, can be converted to a magnetic material having a garnet-like structure without the necessity of ball-milling or other mechanical size reduction and intermixing processes. In accordance with the process of our invention the oxides of the rare earths or, more particularly, yttrium and iron oxides are added to a solution suitable for the preparation of salt baths such as a concentrated sodium hydroxide solution. The oxides are intimately mixed with the caustic or other salt bath components and are heated with stirring to insure good mixing and effect removal of some of the water. The mixture is transferred to a crucible or other suitable vessel and heated without stirring for a period of time sufficient to prepare an essentially amorphous finely divided mixture of materials. The slurry is allowed to cool slowly. When the slurry has cooled to room temperature, the mixture of the finely divided, essentially amorphous oxides are separated from the salt bath components, washed with water to remove any soluble materials and calcined to give a product having ferrimagnetic properties in a garnet-like structure. This method of preparation has definite advantages over the methods described in the prior art in that no mechanical mixing is required and the salt bath material can be removed by dissolution in water.

The best known of these ferrimagnetic materials is the yttrium ferrite, commonly referred to as yttrium iron garnet because of the garnet-like structure of the crystals. However, magnetic materias having a garnet-like structure can be prepared by substituting oxides of the rare earths occupying the positions between samarium and lutetium in the periodic system, for the yttrium oxide. Yttrium ferrite has been investigated more extensively than the rare earth ferrites and, as a result, has become more widely accepted by the electronics industry. Because of this acceptance, yttrium oxide is the preferred oxide for use in the process of this invention.

The final product has a chemical structure represented by the formula $5Fe_2O_3.3M_2O_3$. It is necessary to add a sufficient quantity of the materials to yield a product of this composition. The difficulties encountered in attempting to achieve this final ratio in a molten salt bath system are obvious. There is, for example, a tendency for the formation of ferrite compounds such as sodium ferrite with the salt bath constituents when the salt bath is a sodium compound. However, we have found that if the ferric oxide is present in a substantial excess over that required for the reaction, a suitable yield of the ferrite compound can be recovered from the salt bath. Suitable results are obtained when the ferric ion to rare earth ion ratio is from about 5 to 3 to about 10 to 3. Obviously these ratios are subject to wide variation depending on the salt bath composition and other factors.

The oxides are added to the compound that will eventually form the salt bath and are heated with stirring to a temperature high enough to effect good intermixing and also high enough to remove some or most of the water from the salt bath solution. Thus, where the oxides are mixed with a 60% aqueous sodium hydroxide solution, for example, heating in the first step to about 100 to 185° C. gives satisfactory results. In the second step of the process the oxides in the melt are heated without stirring to a temperature in the range of the melting point of the salt bath material. Thus, in the secondary heating step where sodium hydroxide is used, the slurry is heated to a temperature about 240 to 400° C. In the final step the mixed oxides are removed from the salt bath and washed with water to remove any of the salt bath material that might be present. At this stage the oxide mixture is essentially amorphous and has no magnetic properties. Crystallinity and magnetic properties are imparted to the oxides by heating at the calcination temperature. In most cases, a temperature of about 800 to 1400° C. is preferred.

The time of the reaction in each step depends on the type of oxide used and the material used in the salt bath. Thus, in most cases the prior mixing step where the oxides are heated with a concentrated solution of the salt bath material is complete in about 1½ to 5 hours. The preferred heating time for this step is about 2 hours. The time for the second phase of the reaction is generally about the same as that of the first phase and heating for about the same period of time generally results in a satisfactory product. The final calcination after removal of the soluble impurities from the amorphous oxide mixture is generally complete in about 1½ to 24 hours. In most cases calcining for a period of about 2 to 10 hours is sufficient to impart magnetic properties and a garnet-like structure to the oxide mixture.

The reaction can be carried out in any material which will form a salt bath and which is basic enough so that it does not react with the components. Thus, in most cases the mixed chloride salt baths are not satisfactory because they tend to form iron and the rare earth metal chlorides. The most satisfactory salt bath preparations are the hydroxides such as sodium hydroxide or potassium hydroxide. Other strongly basic materials that are non-reactive with the oxides and which form salt baths might also be considered although cost and availability are important factors which tend to make the hydroxides the preferred materials. The X-ray examination of these materials was conducted using standard X-ray techniques.

The invention will be further illustrated by the following specific but non-limiting examples.

Example I

A polycrystalline ferrimagnetic material having a garnet-like structure was prepared from yttrium and iron oxides. In this run 0.79 gram (0.0049 mole) of ferric oxide, $Fe_2O_3$, and 0.677 gram (0.0030 mole) of yttrium oxide, $Y_2O_3$, were placed in a vessel containing 60 grams of sodium hydroxide and 40 ml. of water. The materials were stirred thoroughly and heated for a period of 1½ hours. At the end of this time the temperature of the slurry was 178° C. The stirrer was removed and the vessel placed in a furnace at 260° C. for a period of two hours. The furnace was shut off and the material allowed to cool gradually over a period of about 20 hours. At the end of this time a brownish crust of oxides had formed on the top of the white opaque solid mass. These oxides were removed, washed with water and dried with acetone. The oxides were transwerred to a crucible and heated to 950° C. for two hours. The product was cooled and examined by X-ray diffraction. The X-ray diffraction pattern showed lines indicating a compound with a yttrium-iron garnet type structure and a trace of a compound with a perovskite like structure were formed in the reaction. The calcined material was strongly attracted to a magnet, indicating the formation of a ferrite material.

It is apparent from these data that a suitable ferrite material having a garnet-like structure can be prepared by mixing the oxides of iron and yttrium in a salt bath.

Example II

Another preparation of yttrium-iron garnet using a sodium hydroxide salt bath was repeated with slight variations in the temperature in some of the steps.

In this run 0.798 gram (0.005 mole) of ferric oxide, $Fe_2O_3$, and 0.677 gram (0.0030 mole) of yttrium oxide, $Y_2O_3$, were placed in a vessel containing 60 grams of sodium hydroxide and 40 ml. of water. The liquid was heated for 2 hours with constant stirring. At the end of this period the temperature of the salt bath was 150° C. The stirrer was removed and the vessel containing oxides and sodium hydroxide was transferred to a furnace and heated to 260° C. for 2 hours. The furnace was turned off and the vessel allowed to cool to room temperature over a period of about 20 hours. At the end of this period the oxides were removed from the top of the solidified mass, washed thoroughly with water to remove any soluble components and dried with acetone. The oxides were transferred to a crucible and heated at 800° C. for a period of about 20 hours and then at 1000° C. for 2 hours. The product was allowed to cool and a sample submitted for X-ray examination. The X-ray diffraction pattern showed lines indicating an yttrium-iron ferrite with a garnet-like structure and some other compound with a perovskite like structure were formed.

Example III

A run was completed in which sodium carbonate was substituted for sodium hydroxide in the salt bath.

In this run 0.798 gram (0.005 mole) of ferric oxide and 0.677 gram (0.0030 mole) of yttrium oxide were placed in a crucible containing 50 grams of sodium carbonate and heated at 900° C. for 4 hours. The melt turned to a hard solid which was ground and washed with water. The slurry was transferred to a filter, the precipitate was separated and washed with water. The precipitate was a green solid material having no magnetic properties. This material was heated at 330° C. for a period of 20 hours. The material was cooled and the physical properties of the product examined. The product was a brownish material having slight magnetic properties. The product was heated to 600° C. for 3 hours and then to 800° C. for an additional 2 hours. The crucible was removed from the furnace, cooled, and a sample of the product submitted for X-ray analysis. The X-ray analysis showed this material was essentially amorphous with very little crystalline material present. The only crystalline material was a trace of a compound with a perovskite-like structure. The material was very slightly magnetic.

It is apparent from these data that the conditions for preparing the material are very important and that sodium carbonate is not as suitable as sodium hydroxide as a salt bath material for use in the preparation of yttrium ferrite with the garnet-like structure.

Example IV

Sodium acetate was investigated as a possible salt bath mixture for preparing yttrium ferrite.

In this run 0.798 gram (0.005 mole) of ferric oxide, $Fe_2O_3$, and 0.677 gram (0.0030 mole) of yttrium oxide, $Y_2O_3$, were placed in a crucible containing 30 grams of sodium acetate. The crucible was heated to 330° C. for a period of about 20 hours. The material was allowed to cool to room temperature at which time the melt solidified. The product was cooled, washed with water and filtered. The solids collected on the filter were washed and transferred to a crucible and heated to 600° C. for about 4 hours and then at 800° C. for about 2 hours. After heating, the material was reddish brown having some magnetic properties. A sample of this material was submitted for X-ray analysis. The X-ray diffraction pattern showed the material was essentially non-crystalline but contained a trace of a compound with a garnet-like structure, presumably a yttrium ferrite.

It is apparent from these data that sodium acetate is not as suitable as sodium hydroxide as a bath for preparing yttrium ferrites.

Obviously many modifications and variations of the invention as hereinabove set forth may be made without departing from the essence and scope thereof and only such limitations should be applied as are indicated in the appended claims.

What is claimed is:

1. A method of preparing a ferrite material having a garnet type structure which comprises the steps of mixing an oxide selected from the group consisting of yttrium oxide and a rare earth oxide wherein the rare earth ion has an ionic radius of less than 1.14 Angstrom units with ferric oxide in the ratio of about 3 moles of said oxide to 5 to about 10 moles of ferric oxide in a concentrated solution of an alkali metal hydroxide, heating said mixture from 1½ to 5 hours with stirring at a temperature of about 100 to 200° C. followed by heating to a temperature of 250 to 400° C. for about 2 to 5 hours, cooling the melt, separating and washing the oxides and calcining said oxides at about 1000° C. for about 2 to 10 hours and recovering the crystalline ferrite product.

2. A method of preparing a ferrite material having a garnet type structure which comprises the steps of mixing yttrium oxide and a rare earth oxide selected from the group consisting of the oxides of samarium, europium, gadolinium, terbium, dysprosium, holmium, ytterbium and lutetium with ferric oxide in the ratio of about 3 moles of yttrium and rare earth oxide to 5 to about 10 moles of ferric oxide, in a concentrated solution of an alkali metal hydroxide, heating said mixture from 1½ to 5 hours with stirring at a temperature of about 100 to 200° C. followed by heating to a temperature of 250 to 400° C. for about 2 to 5 hours, cooling the melt, separating and washing the oxides and calcining said oxides at about 1000° C. for about 2 to 10 hours and recovering the crystalline ferrite product.

3. A method of preparing a ferrite material having a garnet type structure which comprises the steps of mixing yttrium oxide and a rare earth oxide selected from the group consisting of the oxides of samarium, europium, gadolinium, terbium, dysprosium, holmium, ytterbium and lutetium with ferric oxide in the ratio of about 3 moles of yttrium and rare earth oxide to 5 to about 7 moles of ferric oxide in a concentrated solution of sodium hydroxide, heating said mixture from 1½ to 5 hours with stirring at a temperature of about 100 to 200° C. followed by heating to a temperature of 250 to 400° C. for about 2 to 5 hours, cooling the melt, separating and washing the oxides and calcining said oxides at about 1000° C. for about 2 to 10 hours and recovering the crystalline ferrite product.

4. A method of preparing a ferrite material having a garnet type structure which comprises the steps of mixing yttrium oxide and ferric oxide in the ratio of about 3 moles of yttrium oxide to 5 to about 7 moles of ferric oxide in a concentrated solution of sodium hydroxide, heating said mixture from 1½ to 5 hours with stirring at a temperature of about 100 to 200° C. followed by heating to a temperature of 250 to 400° C. for about 2 to 5 hours, cooling the melt, separating and washing the oxides and calcining said oxides at about 1000° C. for about 2 to 10 hours and recovering the crystalline ferrite product.

5. A method of preparing a ferrite material having a garnet type structure which comprises the steps of mixing yttrium oxide with ferric oxide in the ratio of about 3 moles of yttrium oxide to 5 to about 7 moles of ferric oxide in a concentrated solution of sodium hydroxide, heating said mixture with stirring for about 2 hours at a temperature of about 150° C. followed by heating to about 275° C. for about 2 hours, cooling the melt, separating the oxides, washing the oxides with water to remove any water soluble impurities, heating the washed oxides to a temperature of about 1000° C. for about 2 hours, cooling and recovering the crystalline ferrite product.

References Cited in the file of this patent

Gilleo et al.: Magnetic and Crystallographic Properties etc., Physical Review, vol. 110, No. 1, April 1, 1958, pp. 73–78.

Pauthenet: Supplement to vol. 30, No. 4, Jr. Applied Physics, pp. 290S–292S (1959).

Anderson: Supplement to vol. 30, No. 4, Jr. Applied Physics, pp. 299S–300S (1959).